United States Patent Office 2,740,437
Patented Apr. 3, 1956

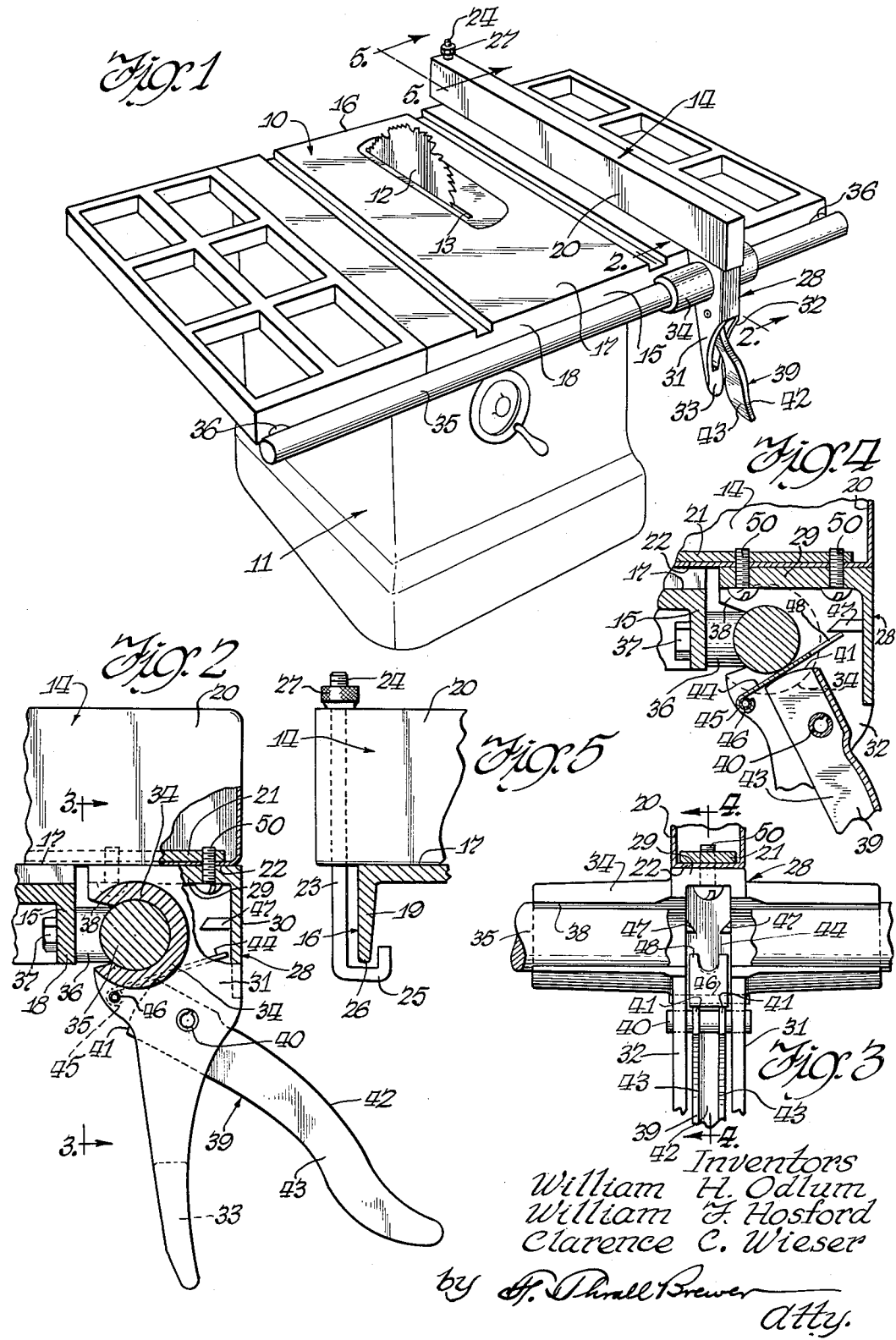

2,740,437

CLAMPING DEVICE FOR GUIDE FENCE ON WORK TABLE

William H. Odlum, Wilmette, and William F. Hosford and Clarence C. Wieser, Chicago, Ill., assignors to Duro Metal Products Co., Chicago, Ill., a corporation of Illinois Application December 7, 1953, Serial No. 396,685

6 Claims. (Cl. 143—174)

This invention relates to a releasable clamping device for use with power tools or the like, and it will be described for purposes of illustration as applied to a fence for a power saw or other cutting tool, although it is not limited to such specific adaptation.

Among the objects of this invention is the provision of a quickly releasable friction clamping device which may be incorporated, for example, in a power tool fence, carriage, etc., and which will enable the operator to locate the device to which it is applied in any selected one of a plurality of available positions, merely by exerting hand pressure on the control element therefor; it being an added feature of our clamping device that the force required to effect clamping action is lateral to the directions of movement of the part being clamped, so that tendency to dislocate the clamped part during the clamping is minimized.

Another of the objects of this invention is the provision of a clamping device which utilizes a pivoted cam as the pressure-creating gripping means, said cam being mounted on a lever manipulated by the operator, to provide an appreciable mechanical advantage, whereby to reduce the amount of force which the operator is required to exert upon the device to effectuate the clamping action and the release thereof.

Another of the objects of this invention is the provision of a clamping device which utilizes a pivoted cam as the pressure-creating gripping means, with means for preventing inadvertent rotation of the pivoted cam to increased gripping position wherein the cam becomes jammed against the stationary portion of the clamping device.

A more specific object of this invention is the provision of a friction type clamping device including a pivoted cam means which supplies the clamping force, and a pressure distributing plate interposed between the cam means and the device to which the cam means is adapted to be clamped, whereby to prevent the formation of undesirable scratches or indentations in the member along which the clamping device is moved.

Another specific object of this invention is to provide, in a clamping device of the type referred to above, a pivoted pressure distributing plate between the elements to be clamped together, with means for limiting the angle through which the plate may be pivoted, whereby to insure the existence of a space, free of obstruction by the pivoted plate, into which the member to which the clamping device is to be affixed may be inserted.

These and other objects of this invention will become apparent from the following detailed description when taken together with the accompanying drawings in which:

Fig. 1 is a view in perspective showing a power tool to which the clamping device of this invention has been applied;

Fig. 2 is an enlarged fragmentary side elevational view, partly in section, which shows the clamping device and wherein the view is taken substantially along the lines 2—2 of Fig. 1;

Fig. 3 is a fragmentary rear elevational view of the clamping device taken substantially along a line 3—3 of Fig. 2;

Fig. 4 is a fragmentary side sectional view of the clamping device wherein the section is taken substantially along a line 4—4 of Fig. 3; and Fig. 5 is a fragmentary side elevational view of the rear portion of the fence of the power tool, taken substantially along the line 5—5 of Fig. 1.

Referring now to the drawings for a detailed description of the invention, the power tool chosen to illustrate an adaptation of this invention is a table saw which includes a table 10 whereon a workpiece is placed for sawing, a supporting base 11, a rotary disc type saw blade 12 extending through a slot 13 in table 10, and a work-positioning fence 14 extending across the top of table 10 in substantially parallel relationship to the plane of the saw blade and from the front 15 to the rear 16 of the table.

As shown more clearly in Figs. 2 and 5, table 10 has a top surface 17, a front flange 18 extending downward from top surface 17, and a rear flange 19 likewise extending downward from the top of table 10.

Fence 14 is a sheet metal structure 20 which is substantially rectangular in horizontal, and both vertical, cross sections and which has a bolting plate 21 on the interior thereof adjacent a bottom wall 22 of said structure.

It will be noted that fence 14, in our disclosed structure, extends beyond both front flange 18 and rear flange 19 of the table. Through that part of the fence 14 which extends beyond rear flange 19, there passes a hook bolt 23 having a threaded portion 24 which projects above the fence 14, a hook portion 25 thereof extending around a free edge 26 of the flange 19. A thumb nut 27 is threaded onto portion 24 of the hook bolt and serves to draw the hook portion 25 of the bolt up against edge 26 of flange 19 to clamp the rear portion of fence 14 to the table whenever desired. When the fence is to be moved laterally toward or away from saw 12, thumb nut 27 is backed off to release the hook portion 25 from its contact with edge 26 of flange 19, and, if desired, said hook bolt may be left in its loose condition even while fence 14 is in use. Said bolt 23 also performs another function which will be described hereinafter.

The portion of fence 14 extending beyond the front flange 18 of table 10 is secured to a frame 28 of the clamping device for said fence 14. In its preferred form, as disclosed, said frame is comprised of a casting having a top wall 29 which is secured by machine screws 50 to the bolting plate 21 in fence 14. Said casting also includes a front wall 30 and spaced side walls 31 and 32 which are joined to a rear wall 33 to form a handle or grip. Side walls 31 and 32 are joined at their upper ends to a sleeve 34 which is relatively long and extends substantially equal distances outwardly from each side wall 31 and 32.

Sleeve 34 is mounted for axial sliding movement on a rod 35 which is secured at its end regions to the front flange 18 of the table 10 by bolts 37 which carry spacers 36 to separate the rod from the flange. Rod 35, in the form chosen to illustrate this invention, is circular in cross section, but it is understood that it may take any other desired cross sectional shape, the circular shape being the most economical and being entirely satisfactory for the purpose. Spacers 36 may also be circular in cross section, the diameter of said spaces, however, being smaller than the diameter of rod 35, and the ends of the spacers being shaped at the ends to conform to the contours of rod 35 and front flange 18 which they abut.

Sleeve 34 is slotted longitudinally at 38 to enable the sleeve to be slipped axially on rod 35 past the spacers 36. Since the diameter of the spacers is less than the diameter of rod 35, the part of the sleeve cut out has an angular expanse of less than 180°, so that the sleeve will remain on said rod unless slipped off axially at the ends of said rod. It may be observed that sleeve 34, being of substantial length, will have little tendency to cock relative to rod 35, and its internal diameter is carefully machined to provide very little clearance over rod 35, to reduce such cooking to an absolute minimum.

Between side walls 31 of the frame 28 is disposed a lever 39 pivoted on a pin 40 which extends through, and is supported by, side walls 31. The upper end of the lever 39 is shaped to serve as a cam, a camming surface 41 (Fig. 4) of which may take the configuration of a segment of a circle, the center of which is eccentric to, and disposed below and to the left of, pin 40 as viewed in Fig. 4. Thus, as lever 39 is rotated about pin 40 in a clockwise direction as viewed in Fig. 4, cam surface 41 will gradually approach rod 35, and at some point will reach a position to effect a clamping action therewith.

Lever 39 is the operating handle of the device and has a smoothly rounded top 42 and substantially parallel sides 43, the ends of which constitute the cam surfaces 41, so that there are actually two cam surfaces, each of a width substantially equal to the thickness of the sides 43. Said sides 43, however, are made only thick enough to have the requisite stiffness for the purpose intended so that excessive downward pressure on lever 39, as viewed in Fig. 2, might cause sufficient pressure to be exerted by cams 41 upon rod 35 to cut or indent said rod. Such cuts or indentations would interfere with the smooth sliding of sleeve 34 on rod 35 and would be undesirable. This is particularly true where, as here, the portion of lever 39 extending downward is considerably longer than the part extending from pivot 40 to the cam surface 41, so that a very large mechanical advantage is established, both by the unequal lever arms and by the inclined plane action of cam surface 41.

To avoid possible damage to the rod 35 by cam surfaces 41, a hardened steel plate 44 is interposed between the cam surfaces 41 and rod 35. Said plate 44 may be made of spring steel and curled at one end 45 to provide an opening through which a pivot pin 46 may be passed to enable plate 44 to swing about the axis of its curled end 45. The interposition of plate 44 between cam surfaces 41 and rod 35 causes the unit pressure normally exerted by cam surfaces 41 upon rod 35 to be reduced by spreading the total pressure over a wider area, and hence damage inflicted upon rod 35 by the cam surfaces 41 is rendered negligible. Furthermore, plate 44 is made perfectly smooth, and due to its resilient nature, is flexible so that it can conform somewhat to the surface or surfaces between which it is compressed.

Inasmuch as fence 14 may at times be removed from table 10, it is necessary that sleeve 34 be readily removable from rod 35 by axially sliding movement therefrom. Once removed, however, plate 44 would normally be free to swing about pin 46 and might assume a position whereto it would block re-entry of rod 35 into sleeve 34. In the disclosed structure, this undesirable condition is prevented by providing one or more stops 47 on the front wall 30 of the frame 28, said stops extending inwardly thereof and being so located that they do not interfere with the normal operation of the clamping device when it is assembled on rod 35, but when the device is removed from rod 35, said stops prevent plate 44 from swinging counterclockwise, as viewed in Fig. 4, to a position in which said plate 44 would interfere with the passage of the rod 35 through sleeve 34 past said plate 44. Thus, stops 47 hold plate 44 at a position in which said plate would normally be out of contact with rod 35, but this position does not prevent or obstruct the operation of the clamping device, since the flexible characteristic of the spring material of which plate 44 is made permits cam surfaces 41 to bend plate 44 into contact with rod 35 when the clamping action is desired. To localize the flexibility of the plate, its end 48 is bifurcated so that a less resilient plate may be used without increasing the amount of force required to secure the desired frictional grip.

In the operation of the device, fence 14 is first slid axially on the rod 35 over table 10 to the desired position relative to the saw blade 12. At this position downward pressure is exerted on the top 42 of lever 39 to cause the cam surfaces 41 to rotate about pivot 40 and compress plate 44 against rod 35. The amount of pressure to be exerted depends upon the judgement of the operator. Such downward pressure does not cause fence 14 to be rotated around rod 35 to raise fence 14 off table 10 since hook bolt 23, having the hook portion 25 engaging the end 26 of flange 19, substantially prevents such rotation. For a smoother engagement, and to reduce the danger of disturbing the fence from the setting desired, the operator may grasp both the free end of lever 39 and the rear plate 33 and sequeeze the two together, rather than merely exert downward pressure on lever 39. It may be observed that the gripping force for setting the clamp is in a direction lateral to the fence movements required for the selection of its position, so that the tendency for changing a selected setting of the fence during the application of clamping pressure is minimized.

To release the clamping device, the free end of lever 39 is pulled upwardly by the operator to pivot the lever about pin 40, and thereby rotate cam 41 to a position wherein its surfaces release the pressure on plate 44. In the released position, fence 14 may be slid along rod 35 to any desired position, or, if desired, it may be removed entirely from said rod and replaced on said rod on the opposite side of saw 12 from that shown in Fig. 1.

Whenever it is desired to move fence 14, thumb nut 27 is first backed off the threaded portion 24 of hook bolt 23 sufficiently to loosen the bolt from flange 19 if it has been tightened. In normal use, however, the hook bolt may be adjusted to a position in which it limits upward movement of the end of the fence, but does not interfere with adjustments of the fence position.

It is understood that the foregoing description is merely illustrative of a preferred embodiment of this invention and that the scope of the invention therefore is not to be limited thereto but is to be determined by the appended claims.

We claim:

1. A releasable clamping device for a fence or the like of a power tool, said device comprising a rod, a fixed support on the power tool for the rod, a sleeve mounted for axial sliding movement on the rod and adapted to be secured to said fence or the like, said sleeve having a longitudinal slot to allow the sleeve to be slid past the rod support and off the rod, a frame member on the sleeve and comprising an abutment extending transversely of the rod, a pivoted cam on the abutment having a cam surface movable toward and away from the rod, a pivoted resilient plate mounted on the abutment and interposed between the cam surface and the rod to reduce the unit pressure exerted by the cam surface on the rod in one direction of movement of the cam toward the rod and to prevent an inadvertent wedging action between the cam and rod upon an attempted rotation of the sleeve on the rod to move the cam in the same direction, and a handle extending from the cam by which said cam is operated to distort the plate against the rod and thereby clamp the sleeve to the rod.

2. A releasable clamping device as described in claim 1, said abutment including a stop for the plate to hold the plate in its normal shape out of contact with the rod, the cam being adapted to distort the plate into clamping engagement with the rod.

3. In a power tool having a work supporting table surrounding the tool, said table having front and rear downwardly depending flanges; a fence comprising a wall extending over the table from the front to the rear flanges thereof, means on the fence extending around the rear flange and adapted substantially to prevent lifting of the fence relative to said rear flange, a rod secured to and extending parallel with the front flange, and releasable friction means secured to the fence and adapted to clamp the fence in a selected position on the rod, said releasable friction means comprising a cam pivoted about an axis substantially parallel with and below the axis of the rod and having a cam surface which is movable toward and away from the rod as the cam is oscillated about its pivot, a hardened resilient plate interposed between the cam surface and rod and adapted to be distorted by the cam surface into contact with the rod to grip the rod frictionally, said plate serving to reduce the unit pressure exerted by the cam upon the rod, and a handle secured to the cam for operating the cam to cause the cam surface to distort the plate as aforesaid.

4. In a power tool having a work supporting table surrounding the tool, said table having front and rear downwardly depending flanges; a fence comprising a wall extending over the table from the front to the rear flanges thereof, means on the fence extending around the rear flange and adapted substantially to prevent lifting of the fence relative to said rear flange, a rod secured to and extending parallel with the front flange, and releasable friction means secured to the fence and adapted to clamp the fence in a selected position on the rod, said releasable friction means comprising a cam pivoted about an axis substantially parallel with and below the axis of the rod, and having a cam surface disposed below the rod and movable upward into clamping engagement with the rod; a handle secured to the cam on the side of the pivot thereof opposite the cam and extending forwardly and downwardly relative to the table, said handle when moved downwardly rotating the cam upwardly about its pivot toward the rod, a hardened resilient pivoted plate interposed between the cam surface and rod and adapted to be distorted by the cam surface against the rod to grip the rod frictionally, said plate serving to reduce the unit pressure exerted by the cam upon the rod, and an abutment secured to the fence and depending therefrom, said abutment carrying the pivot for the cam and plate and extending in proximity to the handle, whereby the cam may be operated by squeezing the handle and abutment together.

5. A fence in a power tool as described in claim 3, said plate being pivoted about an axis parallel with the axis of the rod and adapted to swing about its pivot toward the rod, and stop means fixed relative to said fence, for limiting the swinging movement of the plate in the direction of the rod and holding the plate out of contact with the rod.

6. A fence for a power tool as described in claim 4, and stop means on the abutment for holding the plate out of contact with the rod, said plate being bent into frictional gripping contact with the rod by the cam surface.

References Cited in the file of this patent

UNITED STATES PATENTS

| | | |
|---|---|---|
| 1,638,122 | Jull | Aug. 9, 1927 |
| 2,265,335 | Aumann | Dec. 9, 1941 |
| 2,297,882 | Gardner et al. | Oct. 6, 1942 |
| 2,374,286 | Hargadon | Apr. 24, 1945 |
| 2,677,400 | Gaskell | May 4, 1954 |